(12) United States Patent
Frank et al.

(10) Patent No.: US 9,377,220 B2
(45) Date of Patent: Jun. 28, 2016

(54) COOLING DEVICE FOR A SUPER CONDUCTOR AND SUPER CONDUCTING SYNCHRONOUS MACHINE

(75) Inventors: Michael Frank, Uttenreuth (DE); Peter Kummeth, Herzogenaurach (DE); Wolfgang Nick, Nuremberg (DE); Heinz Schmidt, Moehrendorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 192 days.

(21) Appl. No.: 13/979,141

(22) PCT Filed: Jan. 2, 2012

(86) PCT No.: PCT/EP2012/050018
§ 371 (c)(1),
(2), (4) Date: Jul. 11, 2013

(87) PCT Pub. No.: WO2012/095330
PCT Pub. Date: Jul. 19, 2012

(65) Prior Publication Data
US 2013/0296171 A1 Nov. 7, 2013

(30) Foreign Application Priority Data
Jan. 13, 2011 (DE) .......................... 10 2011 002 622

(51) Int. Cl.
  *F25B 9/14* (2006.01)
  *F25D 19/00* (2006.01)
  *H02K 55/04* (2006.01)
(52) U.S. Cl.
  CPC ............... *F25B 9/14* (2013.01); *F25D 19/006* (2013.01); *H02K 55/04* (2013.01); *Y02E 40/625* (2013.01)

(58) Field of Classification Search
  CPC ............... F17C 7/00; F17C 7/02; F17C 7/04; F17C 13/007; F17C 2227/0107; F17C 2227/0302; F17C 2227/0304; H01B 12/16; Y02E 40/647
  USPC .......................... 62/50.1, 50.2, 51.1; 505/163
  See application file for complete search history.

(56) References Cited

U.S. PATENT DOCUMENTS 2,411,347 A * 11/1946 Trumpler ................ F25B 11/00
                                                                    202/177
2,510,190 A *  6/1950 Nicolette ................ F04D 9/005
                                                                    415/145

(Continued)

FOREIGN PATENT DOCUMENTS

CN       1795602 A      6/2006
CN     101523136 A      9/2009

(Continued)

OTHER PUBLICATIONS

Chinese Office Action and English translation thereof dated Dec. 1, 2014.

(Continued)

*Primary Examiner* — Frantz Jules
*Assistant Examiner* — Nelson Nieves
(74) *Attorney, Agent, or Firm* — Harness, Dickey & Pierce, P.L.C.

(57) ABSTRACT

A super conductor is disclosed, in particular a high temperature super conductor of a synchronous machine, including a cooling circuit for a coolant. The liquefied coolant in the cold head provided with a condenser is guided to the super conductor which is to be cooled, in particular in the rotor of the synchronous machine and is returned to the condenser in a gaseous form. In order to guide the coolant from the condenser to the super conductor, pressure generated by a component of the coolant evaporated by a heat source is used.

14 Claims, 2 Drawing Sheets

(56) References Cited

U.S. PATENT DOCUMENTS

| | | | |
|---|---|---|---|
| 3,729,946 A * | 5/1973 | Massey | 62/50.1 |
| 4,079,273 A | 3/1978 | Lambrecht | |
| 4,111,002 A * | 9/1978 | Van Mal et al. | 62/467 |
| 4,198,828 A * | 4/1980 | Mercier et al. | 62/50.1 |
| 4,227,489 A * | 10/1980 | Regamey | F01K 9/023 122/451 R |
| 4,505,262 A * | 3/1985 | Eaton | F24D 11/003 126/570 |
| 5,848,532 A * | 12/1998 | Gamble et al. | 62/48.2 |
| 6,169,852 B1 * | 1/2001 | Liao et al. | 392/395 |
| 6,173,761 B1 * | 1/2001 | Chandratilleke et al. | 165/104.21 |
| 6,438,969 B1 | 8/2002 | Ackermann | |
| 6,477,847 B1 * | 11/2002 | Bonaquist et al. | 62/99 |
| 6,725,683 B1 * | 4/2004 | Laskaris | 62/259.2 |
| 6,865,897 B2 * | 3/2005 | Jibb | 62/119 |
| 7,049,717 B2 | 5/2006 | Frank et al. | |
| 7,528,510 B2 * | 5/2009 | Frank et al. | 310/52 |
| 8,137,076 B2 * | 3/2012 | Braun | F04F 1/02 417/118 |
| 8,148,857 B2 | 4/2012 | Frank et al. | |
| 8,511,100 B2 * | 8/2013 | Laskaris et al. | 62/51.1 |
| 2007/0095075 A1 | 5/2007 | Frank | |
| 2008/0202127 A1 * | 8/2008 | Mukoyama et al. | 62/51.1 |
| 2009/0014155 A1 | 1/2009 | Manzer | |
| 2009/0241558 A1 * | 10/2009 | Yuan et al. | 62/51.1 |
| 2009/0293504 A1 | 12/2009 | Oomen et al. | |
| 2010/0038980 A1 | 2/2010 | Frank et al. | |
| 2010/0219702 A1 * | 9/2010 | Jajtic | H02K 41/02 310/12.29 |

FOREIGN PATENT DOCUMENTS

| | | |
|---|---|---|
| CN | 101657952 A | 2/2010 |
| DE | 10321463 A1 | 12/2004 |

OTHER PUBLICATIONS

International Search Report PCT/ISA/210 for PCT/EP2012/050018 dated Aug. 28, 2012.
German Office Action for 10 2011 002 622.3 dated Aug. 19, 2011.
European Search Report dated Feb. 13, 2015.
European Search Report dated Jul. 14, 2014.
Search Report for Australian Patent Application No. 2012206690 dated Feb. 3, 2016.
Office Action for Australian Patent Application No. 2012206690 dated Apr. 8, 2018.

* cited by examiner

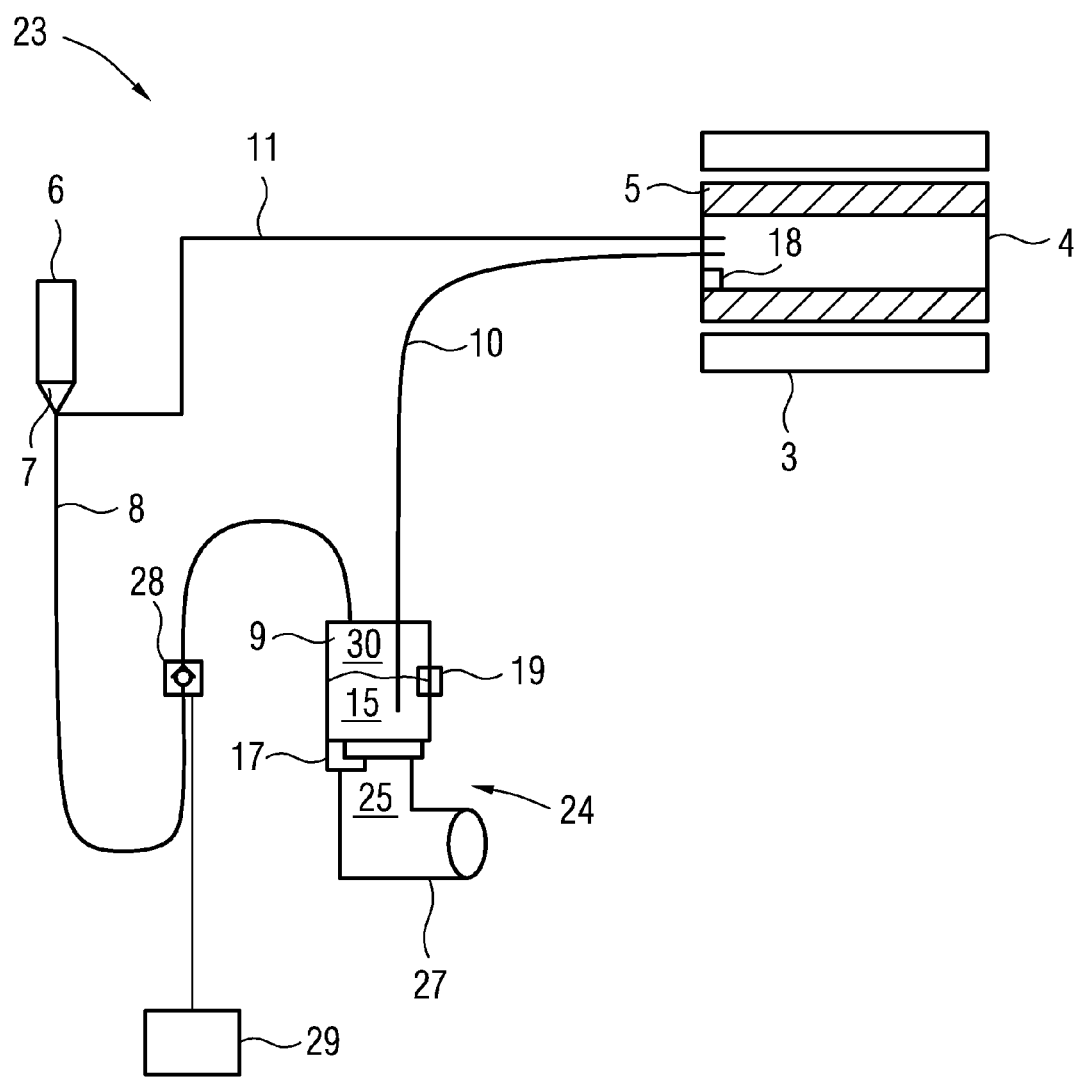

COOLING DEVICE FOR A SUPER CONDUCTOR AND SUPER CONDUCTING SYNCHRONOUS MACHINE

PRIORITY STATEMENT

This application is the national phase under 35 U.S.C. §371 of PCT International Application No. PCT/EP2012/050018 which has an International filing date of Jan. 2, 2012, which designated the United States of America and which claims priority to German patent application number DE 10 2011 002 622.3 filed Jan. 13, 2011, the entire contents of each of which are hereby incorporated herein by reference.

FIELD

At least one embodiment of the invention generally relates to a cooling device for a superconductor, in particular a high temperature superconductor of a synchronous machine, comprising a cooling circuit for a coolant, the coolant liquefied in a cold head with a condenser being conducted to the superconductor to be cooled, in particular into the rotor of the synchronous machine, and being conveyed back to the condenser in gaseous form. At least one embodiment of the invention also generally relates to a superconducting synchronous machine, in particular for use on a vessel.

BACKGROUND

In so-called superconducting machines at least one superconducting winding is provided, with so-called high temperature superconductors (HTS superconductors) frequently being used. HTS superconductor refers to metal oxide superconductor materials with transition temperatures tc above 77K.

Cryogenic liquids are generally used as the coolant to cool superconductors, in particular also in superconducting machines. Thus for example cooling devices for HTS superconductors are known, in which for example a coolant in the form of neon gas or nitrogen is liquefied at a cold head with a condenser in a closed system. From there the coolant flows out into the part supporting the superconductor, for example a rotor to be cooled. The evaporating coolant returns to the condenser and is liquefied again there. The so-called thermosiphon effect is utilized in this process. The liquid coolant evaporates at a heat conducting support, which supports the superconductor, in particular a winding support, and flows back to the condenser in a gaseous form due to the pressure difference resulting from the evaporation in the evaporator and the condensing in the condenser chamber of the condenser. Such coolant flows are also referred to as heat pipes.

The liquid coolant is transported to the superconductor by gravity with known cooling devices. This means that the condenser is disposed geodetically higher than the evaporator. A closed cooling system is generally formed.

This procedure always proves problematic, when an oblique position of the cooling device or the synchronous machine containing it can occur, as is possible for example with superconducting synchronous machines for use on ships, in other words for example HTS motors or HTS generators. With vessels such as ships an oblique position or inclination of the ship can easily occur. Such static slanting positions are referred to as trim but dynamic slanting positions are also possible. In some instances the liquid coolant may then not be able to reach the evaporator and its cooling action will fail.

To resolve this problem it has been proposed that whenever inclination of the cooling device and in particular therefore also the coolant line may occur, the geodetic height of the liquid level is used or the entire superconducting machine is installed already inclined. This means in particular that the condenser with the cold head is disposed much higher than the superconductor to be cooled. If there is enough liquid coolant in the closed system and the liquid level is therefore high enough, the liquid coolant can be conveyed to the superconductor, in particular into the rotor, despite a rising coolant line.

This procedure has the disadvantage that a large quantity of liquid coolant has to be maintained in the system. There are also restrictions in respect of the arrangement of the different components and the course of the coolant lines, which affects the design of the cooling device.

These design restrictions are also present in other areas of application, when there is little space, meaning that a geodetically higher condenser with a cold head, which is generally connected to a refrigeration unit, cannot be provided. This applies in particular in the case of height restrictions for a device, for example a rail motor unit or the like.

The use of mechanical devices such as pumps requires a large outlay in respect of equipment and energy, which increases further for low coolant temperatures.

SUMMARY

At least one embodiment of the invention specifies a cooling device for a superconductor, which reliably transports the coolant to the superconductor to be cooled, without using a gravitation effect to do so, thereby being subjected to the corresponding restrictions.

A cooling device is disclosed for a pressure generated by a component of the liquefied coolant evaporated by way of a heat source to be used to convey the coolant from the condenser to the superconductor.

According to at least one embodiment of the invention, it is proposed that the cooling device be provided with a heat source, which is disposed in the conveying segment between the condenser and the superconductor to be cooled and is configured to operate in such a manner that the evaporated, therefore voluminous, coolant causes a pressure to build up, which conveys the coolant to the superconductor to be cooled. This allows the liquid coolant to be conveyed upward to the superconductor to be cooled, in particular into the rotor, without utilizing gravity. Instead it uses a pressure rise, which is produced by a heat source in the region of the liquid coolant and pushes the coolant ultimately toward the superconductor.

BRIEF DESCRIPTION OF THE DRAWINGS

Further advantages and details of the present invention will emerge from the example embodiments described below and from the drawing, in which:

FIG. 3 shows a basic outline of a second example embodiment of the inventive cooling device.

DETAILED DESCRIPTION OF THE EXAMPLE EMBODIMENTS

Figure 1:
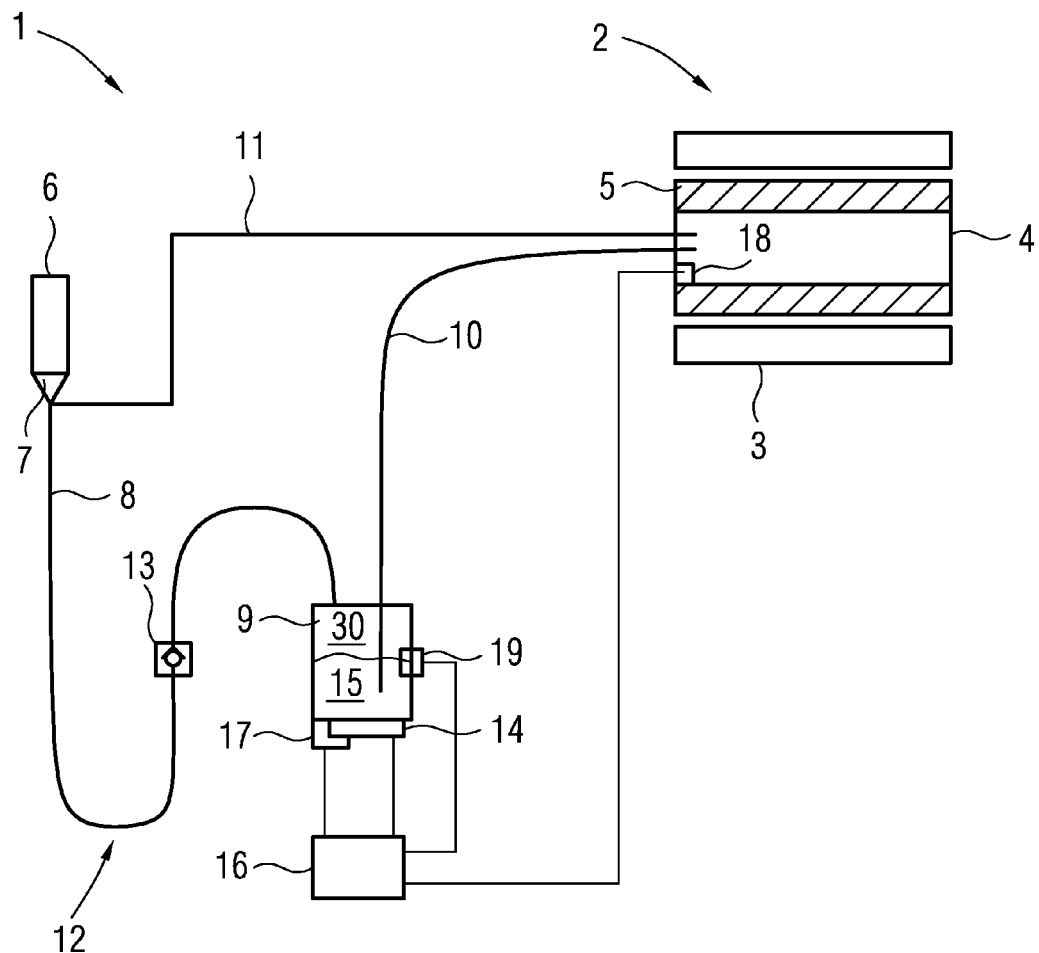
FIG. 1 shows a basic outline of a first example embodiment of the inventive cooling device.

According to at least one embodiment of the invention, it is proposed that the cooling device be provided with a heat source, which is disposed in the conveying segment between the condenser and the superconductor to be cooled and is configured to operate in such a manner that the evaporated, therefore voluminous, coolant causes a pressure to build up, which conveys the coolant to the superconductor to be cooled. This allows the liquid coolant to be conveyed upward to the superconductor to be cooled, in particular into the rotor, without utilizing gravity. Instead it uses a pressure rise, which is produced by a heat source in the region of the liquid coolant and pushes the coolant ultimately toward the superconductor.

Such a coolant supply is in particular suitable for use on ships, as the liquid coolant can be conveyed regardless of the actual position of the ship in relation to the horizontal. The quantity of liquid coolant can be selected with more flexibility and the condenser no longer has to be higher than the outlet opening of the line segment in the part supporting the superconductor, in particular the rotor. In the case of a synchronous machine the superconductor can be attached for example to a thermally conductive winding support, which forms the delimitation of an interior space of the rotor, which acts as the evaporator chamber.

Provision can specifically be made for a reservoir connected by a first line segment to the condenser and by a second line segment to the part supporting the superconductor to be cooled and acting as an evaporator, in particular the rotor, to be provided for liquid coolant, with the heat source coupled thereto. Therefore some of the liquid coolant is converted to a gaseous state in the reservoir, so that a pressure results, which conveys the coolant out of the reservoir toward the superconductor.

At least one embodiment of the present invention in particular allows the second line segment to be configured as a rising pipe. The pressure generated by way of the component of the coolant evaporated by the heat source therefore allows the coolant ultimately to be conveyed counter to gravity, in other words upward.

As with at least one embodiment of the present invention, gravity no longer provides the conveying force, it is also possible for the second line segment to be at least partially flexible. A rigid pipe no longer has to be used but it is for example possible for the second line segment to comprise a corrugated tube and/or bellows, through which the liquid coolant flows, driven by the pressure in the reservoir.

In one particularly expedient embodiment of the present invention provision can be made for a valve, in particular a non-return valve, to be provided upstream of the reservoir on the condenser side. The valve therefore serves the purpose of directing the pressure pushing out from the reservoir into both line segments to the second line segment in the direction of the part or superconductor to be cooled when the valve is closed, in order to achieve efficient conveying. While it is possible in principle, as will be examined in more detail below, to use a controlled valve, according to the invention it is preferable for a non-return valve to be used, which, without further control, simply allows the coolant to flow out of the condenser into the reservoir but does not allow liquid coolant to be pushed back into the condenser. Valve control is advantageously not required with a non-return valve, thereby increasing operational reliability, as the possibility of the valve burning out is excluded.

When a non-return valve that utilizes gravitation forces is used, the non-return valve that utilizes gravitation forces can preferably be disposed in the rising part of a siphon adjacent to the reservoir. Non-return valves based on a load exposed to gravitation, for example a ball provided in the non-return valve, can be used here for example. The line segment to the liquid reservoir is therefore configured as a siphon and the non-return valve is positioned in the rising line part shortly before the reservoir.

As mentioned above, at least one embodiment of the present invention generally allows the condenser to be disposed lower than the cooling superconductor so that such an embodiment can also be selected specifically with the inventive cooling device.

In one advantageous development of the inventive idea, the heat source can be an in particular at least one electrical heating device. A heating device, in particular an electrical heating device, has the advantage that the heating times, therefore the operation of the heating device, can be controlled in a particular simple manner. Thus the heating device can expediently be operated cyclically. This is advantageously possible in particular when using a non-return valve, as during an operating phase of the heating device the non-return valve is closed by the evaporating coolant and the rising pressure conveys the liquid coolant to the superconductor by way of the second line segment, for example the rising pipe. When the heater is switched off again, the pressure drops and the liquid reservoir can easily be filled again, which means that liquid coolant can flow from the condenser. If a controlled valve is used instead of a non-return valve, the valve can also be closed during operation of the heating device, in order to convey the liquid coolant due to the pressure rise.

Provision can be made here for the ratio of the operating phase of the heating device to the non-operating phase of the heating device to be greater than 40%, in particular greater than 50%, and/or for the heat output during the operating phase to be less than double the cold head output, in particular less than the cold head output. The heating device, which is coupled in particular in the liquid reservoir, is operated cyclically here, but with a relatively small heat output being used compared with other cooling methods, for example injection cooling. This advantageously reduces the risk of the heating device burning out considerably. Also the time during which heating actually takes place, in other words the operating phase of the heating device, can be much longer than with impulse cooling. This also serves to protect the heating device against burning out and can be implemented particularly advantageously in the inventive arrangement, particularly when a reservoir with an upstream non-return valve is used.

It should be noted here that it is in principle possible, when a heating device is used, to provide for continuous operation of the heating device but provision must then be made for a specific design of the individual components of the cooling device, which still allows coolant to flow from the condenser. Cyclical operation is therefore preferred.

The abovementioned cyclical operation does not have to be periodic but regulation can expediently take place. The heating device can be regulated based on the temperature of the heating device and/or the temperature at the superconductor and/or the fill level of the reservoir. Corresponding sensors are therefore provided, for example temperature sensors at the heating device and the superconductor and/or fill level sensors at the reservoir, it being possible for their input data to be supplied to a control device for the heating device (and optionally an activatable valve). The control device is then configured to regulate the heating device based on the temperature of the heating device and/or the temperature at the superconductor and/or the fill level of the reservoir, further and/or other parameters that influence regulation of course also being possible.

In another embodiment it is in principle also possible for a connection to a gas, in particular outside air, coupled by way of a thermal bridge, to be used as the heat source, the temperature of the gas being higher than the boiling temperature of the coolant. A coupling of the liquid coolant, in particular the reservoir, to a temperature level above the boiling point of the coolant can therefore also be used, in particular in conjunction with the use of an abovementioned controlled valve. This is therefore a passive thermal coupling to the reservoir, allowing the reliability of the cooling device to be further improved due to the absence of an actively operated heating device. It should however be ensured with this embodiment that, particularly when the activatable valve is open, a flow of liquid coolant into the reservoir or point where the heat source acts is ensured. This allows a sort of thermal connection "to the outside" to be used in particular, so that ambient air can be used as the heat carrier. It is of course also possible to use other gases or coolants.

In addition to the cooling device, at least one embodiment of the present invention also relates to a superconducting synchronous machine, in particular an HTS synchronous machine, in particular for use on a vessel, comprising an inventive cooling device. As mentioned above, gravitation is not used to convey the coolant to the superconductor to be cooled, so the impact of an oblique position is much less with the inventive cooling device. A synchronous machine fitted with an inventive cooling device can therefore be used particularly advantageously on a ship, for example as a generator or motor. The inventive cooling device can therefore be used in the same manner for other applications, in which gravitation conveying appears unreliable due to possible oblique positions relative to the force of gravity, for example applications in which structural restrictions mean that a condenser cannot be disposed higher than the rotor for the evaporation chamber.

All the embodiments relating to the inventive cooling device apply in the same manner to the inventive synchronous machine, so the abovementioned advantages can also be achieved herewith.

FIG. 1 shows a basic outline of an inventive cooling device 1, which is assigned to a synchronous machine 2 operated in a ship, to cool superconducting windings 5 disposed within a rotor 4 that can be rotated relative to a stator 3. The windings 5 are made from a high-temperature superconductor and are supported by a thermally conductive winding support, which is disposed in a vacuum housing and the inner delimitations of which form an essentially cylindrical interior space extending in the axial direction.

In the present instance neon gas is used as the coolant for cooling the superconductor, being moved in a closed cooling circuit. Gaseous coolant is liquefied in a condenser chamber of a condenser 7, which is connected thermally to a cold head 6, which is coupled thermally as known in principle to a refrigeration unit. This liquid coolant is now passed by way of a first line segment 8, a reservoir 9 and a second line segment 10 to the superconducting windings 5 in the rotor 4, the introduction of the liquid coolant into the rotor 4 being known sufficiently in the prior art so that it does not have to be set out in more detail here.

As part of the cooling action the coolant evaporates at the winding support, thereby cooling the windings 5. The interior space of the rotor 4 therefore acts as the evaporation chamber. The coolant is conducted back by way of a return line 11 to the condenser 7, where it is liquefied again. This closes the cooling circuit.

Because the condenser 7 is disposed much lower than the rotor 4 and the second line segment 10 is configured as a rising pipe, gravitation is not used as the conveying force in the cooling device 1. Instead a pressure generated by evaporated coolant 30 is used to convey the liquid coolant through the second line segment 10 into the rotor 4.

It can be seen that upstream of the reservoir 9 the first line segment 8 forms a siphon 12, in the subsegment of which, adjacent to the reservoir 9 and directed upward counter to the force of gravity, a non-return valve 13 is provided. Disposed on the base of the reservoir 9 is a heat source in the form of a heating device 14, in this instance an electrical heating device 14. During operation the heating device 14 acts on the liquid coolant 15 present in the reservoir 9 so that the evaporated coolant 30 results and a pressure occurs. This pressure conveys the liquid coolant 15 through the second line segment 10 into the interior space of the rotor 4 but not back to the condenser 7, as the non-return valve 13 closes automatically.

The heating device 14 is operated cyclically, controlled by a control device 16. The control device 16 regulates the operation of the heating device 14 during this process, based on the data from a temperature sensor 17, which measures the temperature of the heating device 14, a temperature sensor 18, which measures the temperature in the rotor 4, and a fill level sensor 19, which measures the fill level of the reservoir 9. Such regulation generally produces a cyclical operation of the electrical heating device 14, with which the operating phases can be selected to be much longer than with impulse cooling and similarly low heat outputs can be achieved during the operating phases. For example the ratio of the time, during which the heating device is active, in other words the operating phase, to the non-operating phase can be selected to be greater than 40%, preferably greater than 50%. The heat output can be selected so that it is less than double the cold head output, in particular less than the cold head output. It should be noted again here that in instances where provision is to be made for a long operating phase of the heating device 14, it may be expedient to provide a collector for liquid coolant 15 at the cold head, to retain the coolant 15 during phases in which no coolant can flow.

When pressure builds up due to the operation of the heating device 14, the non-return valve 13 closes and liquid coolant 15 is conveyed into the rotor 4. During a non-operating phase of the heating device 14 the non-return valve 13 can open again and liquid coolant 15 flows into the reservoir 9. The low heat outputs and long operating times extend the service life of the heating device 14 and ensure quasi-continuous conveying of coolant 15 into the rotor 4. The duration of the operating phases can be in the region of seconds or minutes, depending on the design of the system.

It should be noted here that instead of the non-return valve 13 a controlled valve can also be used, which is also activated by the control device 16.

In this example embodiment the second line segment 10 is configured as partially flexible, for example in the form of a corrugated tube and/or bellows, which is possible as conveying does not take place by way of gravitation force but by way of the pressure that has built up in the reservoir 9.

Figure 2:
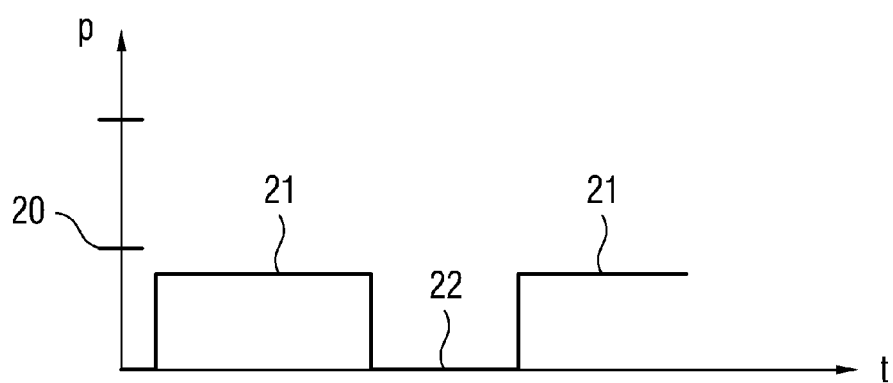
FIG. 2 shows a graph of the operation of a heating device.

Again for clarification FIG. 2 shows possible operating phases of the heating device 14, with the heat output plotted against time. The value 20 corresponds to the cold head output. It can be seen that long operating phases 21 with low output can be implemented, separated by non-operating phases 22.

It should also be noted that it is in principle also possible for the control device 16 to be configured to regulate the absolute amount of the heat output during the operating phases of the heating device 14, if such regulation is expedient.

FIG. 3 shows a modified embodiment of an inventive cooling device 23 compared with the cooling device 1, in which identical components are shown with identical reference characters for the sake of simplicity. There are no differences in respect of the rotor 4, the line segments and lines 8, 10 and 11, the condenser 7 and the cold head 6 or the reservoir 9. However in contrast to the cooling device 1 a gas 26 coupled by way of a thermal bridge 25, in this instance the outside air by way of a pipe 27, is used here as the heat source 24. There is therefore a continuous heat input, so that instead of the non-return valve 13 a controlled valve 28 is also provided, which is operated by way of a control device 29, in some instances again as a function of the values measured by the sensors 17, 18 and 19. Whenever liquid coolant 15 is to flow into the reservoir, the valve 28 is opened.

The invention claimed is:

1. A cooling device for a superconductor, comprising:
   a cooling circuit for a coolant, the coolant being liquefied in a cold head with a condenser being conducted to the superconductor to be cooled, and being returned to the condenser in a gaseous form, wherein a pressure generated by a component of the coolant, evaporated by way of a heat source, is used to convey the coolant from the condenser to the superconductor, and wherein the heat source is a heating device, operable cyclically, wherein a ratio of an operating phase of the heating device to a non-operating phase of the heating device is greater than 50%, and/or heating power during the operating phase is less than double the cold head cooling power;
   a reservoir for liquid coolant, connected by a first line segment to the condenser and by a second line segment to a part supporting the superconductor to be cooled, the heat source being coupled to the reservoir; and
   a valve, provided upstream of the reservoir on the condenser side, wherein the valve utilizes gravitation forces and is disposed in a rising part of a siphon adjacent to the reservoir.

2. The cooling device of claim 1, wherein the second line segment is configured as a rising pipe.

3. The cooling device of claim 1, wherein the second line segment is at least partially flexible.

4. The cooling device of claim 1, wherein the condenser is disposed relatively lower than the superconductor to be cooled.

5. The cooling device of claim 1, wherein the heating device is regulatable based on at least one of a temperature of the heating device, a temperature the superconductor and fill level of the reservoir.

6. A superconducting synchronous machine, comprising the cooling device of claim 1.

7. The cooling device of claim 1, wherein the cooling device is connected to a high temperature superconductor of a synchronous machine.

8. The cooling device of claim 1, wherein the liquefied coolant is conducted into a rotor of a synchronous machine.

9. The cooling device of claim 1, wherein the heating device is an electrical heating device.

10. The cooling device of claim 1, wherein the heat power during the operating phase is less than the cold head cooling power.

11. The cooling device of claim 1, wherein the coolant is liquefied into a rotor of the synchronous machine, and wherein the reservoir is connected by the second line segment to the rotor.

12. The cooling device of claim 1, wherein the valve is a non-return valve.

13. A cooling device for a superconductor, comprising:
    a cooling circuit for a coolant, the coolant being liquefied in a cold head with a condenser being conducted to the superconductor to be cooled, and being returned to the condenser in a gaseous form, wherein a pressure generated by a component of the coolant, evaporated by way of a heat source, is used to convey the coolant from the condenser to the superconductor, wherein the heat source is a connection to a gas, coupled by way of a thermal bridge, is used as the heat source, a temperature of the gas being higher than a boiling temperature of the coolant;
    a reservoir for liquid coolant, connected by a first line segment to the condenser and by a second line segment to a part supporting the superconductor to be cooled, the heat source being coupled to the reservoir; and
    a valve, provided upstream of the reservoir on the condenser side, wherein the valve utilizes gravitation forces and is disposed in a rising part of a siphon adjacent to the reservoir.

14. The cooling device of claim 13, wherein the gas is outside air.

* * * * *